United States Patent
Aamir et al.

(10) Patent No.: US 11,877,544 B1
(45) Date of Patent: Jan. 23, 2024

(54) OPEN LAND OVERHEAD MOVEABLE NOZZLE SPRINKLE IRRIGATION SYSTEM FOR VARIED TERRAIN

(71) Applicant: KING FAISAL UNIVERSITY, Hofouf (SA)

(72) Inventors: Muhammad Aamir, Hofouf (SA); Muhammad Sajid, Hofouf (SA); Nazeer Muhammad, Hofouf (SA)

(73) Assignee: KING FAISAL UNIVERSITY, Hofouf (SA)

( * ) Notice: Subject to any disclaimer, the term of this patent is extended or adjusted under 35 U.S.C. 154(b) by 0 days.

(21) Appl. No.: 18/126,033

(22) Filed: Mar. 24, 2023

(51) Int. Cl.
*A01G 25/00* (2006.01)
*A01G 25/02* (2006.01)
*B05B 15/628* (2018.01)
*B05B 13/04* (2006.01)

(52) U.S. Cl.
CPC ......... *A01G 25/02* (2013.01); *B05B 13/041* (2013.01); *B05B 15/628* (2018.02)

(58) Field of Classification Search
CPC . B05B 13/041; B05B 15/628; B05B 13/0452; A01G 25/02; A01G 25/097; A01G 25/095; A01G 9/247
See application file for complete search history.

(56) References Cited

U.S. PATENT DOCUMENTS

| | | | | |
|---|---|---|---|---|
| 2,879,945 | A * | 3/1959 | Johnson | A01G 25/095 104/111 |
| 6,159,371 | A | 12/2000 | Dufay | |
| 6,192,909 | B1 * | 2/2001 | Strausser | E04H 15/40 5/113 |
| 6,210,125 | B1 | 4/2001 | Eller et al. | |
| 6,390,387 | B1 * | 5/2002 | Stehling | A01M 7/0064 239/750 |
| 2007/0107718 | A1 | 5/2007 | Filippone | |
| 2009/0084615 | A1 | 4/2009 | Parod et al. | |
| 2012/0286076 | A1 | 11/2012 | Korus et al. | |
| 2018/0243773 | A1 * | 8/2018 | Davis | A01C 23/007 |
| 2019/0195513 | A1 | 6/2019 | Colon et al. | |
| 2019/0297796 | A1 | 10/2019 | Gerdes et al. | |
| 2020/0284038 | A1 | 9/2020 | Sirota et al. | |
| 2021/0025148 | A1 | 1/2021 | Stewart | |

\* cited by examiner

*Primary Examiner* — Tuongminh N Pham
(74) *Attorney, Agent, or Firm* — Nath, Goldberg & Meyer; Richard C. Litman

(57) ABSTRACT

An irrigation system is configured with a sprinkler module resting on at least two guide rails supported in a parallel arrangement by a plurality of legs, with the legs forming a rack used to provide a guideway for a sprinkler module along the guide rails, with the guide rails and cross supports arranged to form a plane. An adjustment is provided for positioning the plane of the guide rails and cross supports at tilt or angular adjustment of the plane to provide a selected alignment of the plane with a terrain location of the irrigation system. The sprinkler module is connectable to a water source capable of providing a water supply for discharge through the sprinkler modules; and at least one tracking wheel drive motor, such as a water powered drive motor or an electric motor, is provided for driving the sprinkler module along the guide rails.

4 Claims, 3 Drawing Sheets

OPEN LAND OVERHEAD MOVEABLE NOZZLE SPRINKLE IRRIGATION SYSTEM FOR VARIED TERRAIN

BACKGROUND

TECHNICAL FIELD

The present disclosure relates to agricultural irrigation, and in particular to an agricultural irrigation system useful for irrigation of uneven and hilly terrains.

BACKGROUND

There are 4 main type of irrigation systems in common use.
1. Surface irrigation;
2. On land sprinkler irrigation;
3. Subsurface irrigation;
4. Drip irrigation.

It is rare to see overhead moving sprinkling or sprinkle irrigation systems for uneven lands.

For uneven and/or hilly areas, flood and drip irrigation is often not practical, as both require installation of pumps and other water flow control devices. Flood irrigation is often provided by diversion of water through irrigation canals, which is typically impractical or impossible in hilly regions. Drip irrigation likewise requires water supplied at a consistent rate and pressure, and therefore is more common along level terrain.

Open land overhead movable irrigation systems can be used for agricultural irrigation. It is common to see open land overhead movable irrigation systems on level ground, as movable, circular or movable circular sprinkle irrigation systems, and surface irrigation. Additionally, land sprinkle irrigation, subsurface irrigation and drip irrigation are primarily found on level land, in particular, installation of operational open land overhead movable irrigation system for uneven and hilly lands is difficult and rarely used. As indicated above, most agricultural irrigation systems employ flood irrigation, drip irrigation, land sprinkle irrigation, water gun irrigation and circular moving irrigation systems. These systems have advantages and disadvantages but most cannot be employed on uneven open lands.

While agricultural irrigation is described, the disclosed techniques also can be used for irrigation of land that is not specifically intended for agricultural use.

SUMMARY

An irrigation system is configured with a sprinkler module resting on at least two guide rails supported by a plurality of legs. The legs are positionable in a substantially vertical alignment; and the guide rails are maintained at a substantial parallel separation by at least two cross supports and form a rack used to provide a guideway for a sprinkler module along the guide rails, with the guide rails and cross supports arranged to form a plane. An adjustment is provided for positioning the plane of the guide rails and cross supports at tilt or angular adjustment of the plane to provide a selected alignment of the plane with a terrain location of the irrigation system. The sprinkler module includes a support and a plurality of sprinkler nozzles. The sprinkler module is connectable to a water source capable of providing a water supply for discharge through the sprinkler modules; and at least one tracking wheel drive motor, such as a water powered drive motor or an electric motor, is provided for driving the sprinkler module along the guide rails.

DETAILED DESCRIPTION

The disclosed technique uses a rack-mounted moving sprinkler array, in which the sprinkler array is mounted to a pipe roller. The rack is positioned over an area to be irrigated. The pipe roller moves along rails or support pipes (pipe rails) that are part of a rack.

The present disclosure relates to an agricultural irrigation system useful for irrigation of uneven and hilly terrain and where flood and drip irrigation is not practical. The systems and technique allow for overhead irrigation from a movable nozzle sprinkler and includes a support structure, which may be a steel, aluminum or similar support structure, a movable nozzle sprinkler assembly, a water storage tank, a pipe roller assembly, water pump, and a solar photovoltaic electrical supply system. The system requires no underground piping network as required in conventional drip irrigation systems. Additionally, given that the system is above ground and deployed overhead, the ground beneath can be plowed, tilled, and cultivated underneath while the disclosed irrigation system remains in place. While an agricultural irrigation system is described, the disclosed systems and techniques can be applied for other uses of irrigation or water spreading operations.

The present irrigation system can work effectively as a stand-alone system, as the local water supply and power are connected to be movable. The system affords time and water savings, as well as providing water that is more near to natural rain containing mixed nitrogen and other nutrients from the air necessary for plant and crops growth. The system includes a support structure, a movable (manual or automatic) nozzle spraying assembly, water storage tank, pipe roller assembly, water pump and solar PV electricity supply system. This system requires no underground piping network as would be required in case of drip irrigation system. The system is easy to maintain, as all parts of the system are on and above the ground.

In one configuration, the technique is able to operate with minimal energy consumption. The system uses a solar array to power a pump. In a non-limiting example, movement of the rack-mounted sprinkler array can be achieved by use of a water flow drive to cause the sprinkler array to travel along the rack or by use of an electric motor. The movement can be automatic or manual, which allows control of the amount of water laid down on the surface.

Figure 1:
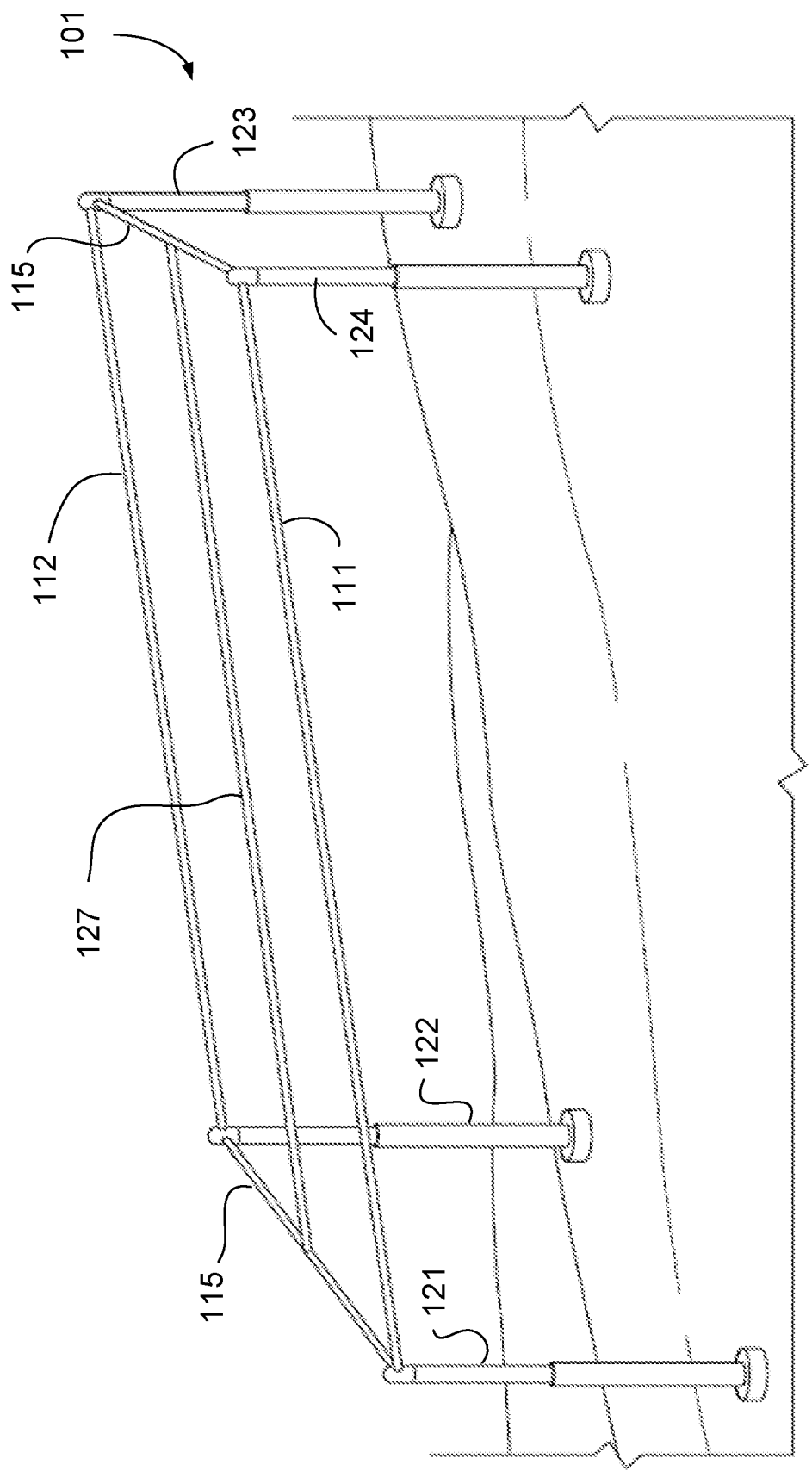
FIG. 1 is a schematic diagram showing a rack used to provide a guideway for a sprinkler module.

FIG. 1 is a schematic diagram showing a rack 101 used to provide a guideway for a sprinkler module. Rack 101 has two guide rails 111, 112, cross supports 115 and legs 121-124. Supplemental guide rails 127 may be provided, and additional support legs (not shown) may be provided for additional support, which is especially useful over long runs on which legs 121-124 would not provide sufficient support as is common in the case of large area movable agricultural sprinklers. It is understood that any number of legs 121-124 and/or guide rails 111, 112 are contemplated within the scope of this disclosure, and that the number of elements shown in FIGS. 1-3 are for illustrative purposes only.

Legs 121-124 in FIG. 1 have a telescoping feature which allows height adjustment, according to the underlying topography, by use of a telescoping feature. Height adjustment of rack 101 is thereby achieved by telescoping legs 121-124, which results in a height adjustment of guide rails 111, 112 at their attachments to legs 121-124.

Figure 2:
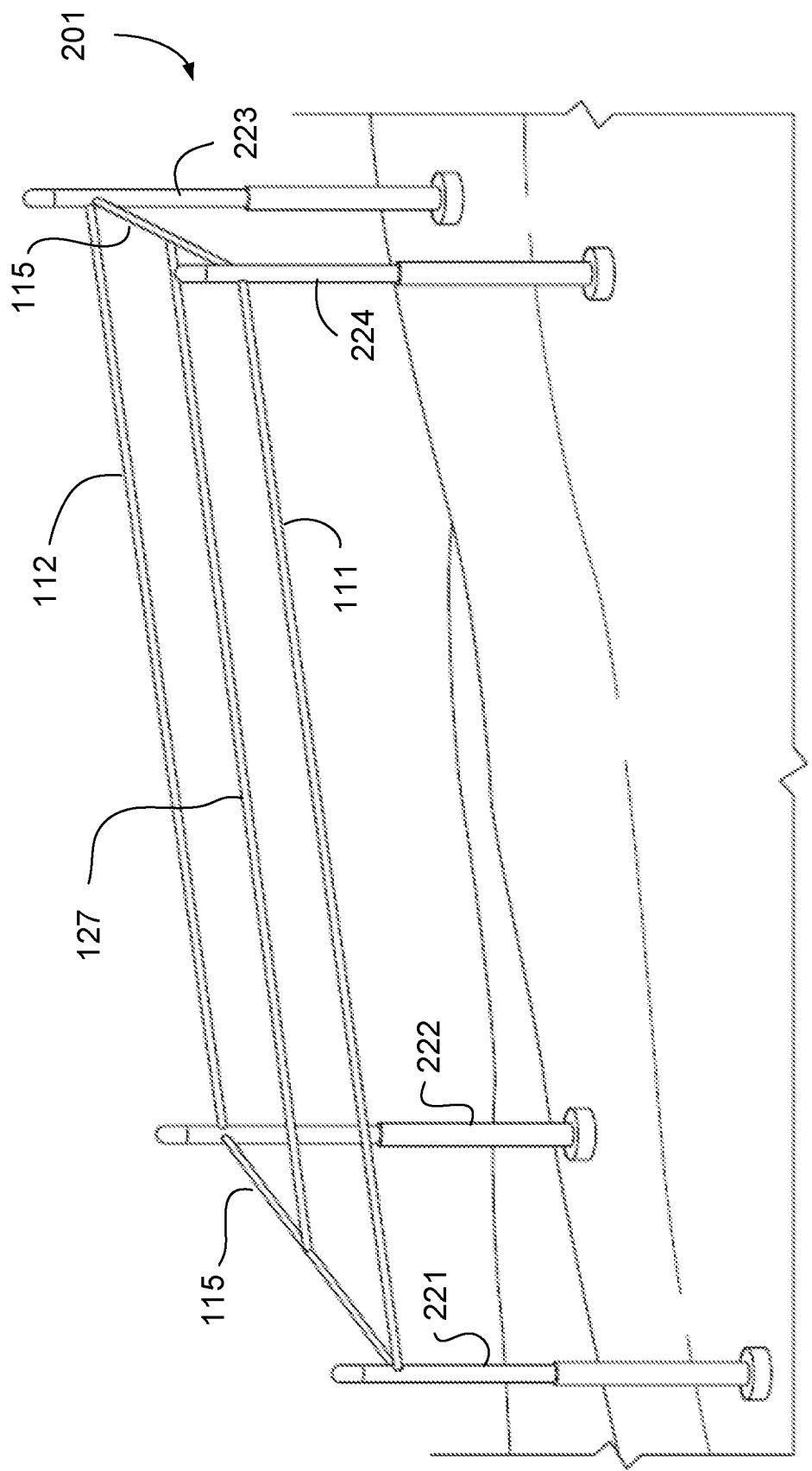
FIG. 2 is a schematic diagram showing rack used to provide a guideway for a sprinkler module, in which height adjustment is achieved by positional location of the guideway on its legs.

FIG. 2 is a schematic diagram showing rack 201 used to provide a guideway for a sprinkler module, in which height adjustment is achieved by positional location on legs 221-224. The positional location may be adjusted by lift devices or jacks or by manual placement, for example by pins or other positional attachment devices. As is the case with the example depicted in FIG. 1, the adjustment provides height adjustment, according to the underlying topography.

Figure 3:
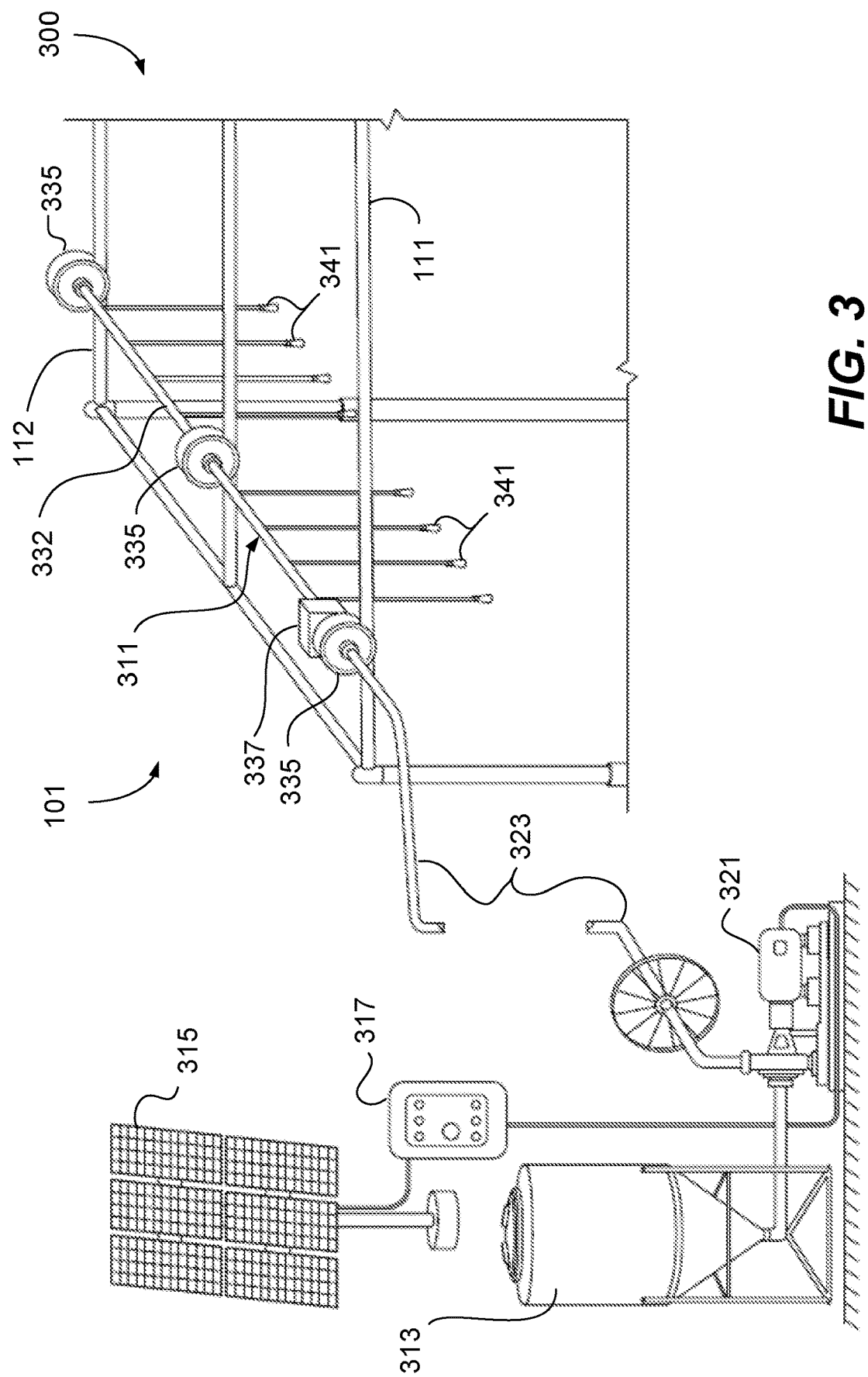
FIG. 3 is a schematic diagram showing a sprinkler system using the rack of FIG. 1.

FIG. 3 is a schematic diagram showing a partial sprinkler system 300 using rack 101 or 201 of FIG. 1. In addition to rack 101 or 201, depicted are sprinkler head module 311, water storage tank 313, solar array 315, power control and inverter 317, water pump 321 and water supply hose 323.

Sprinkler head module 311, includes sprinkler head carrier 332, tracking wheels 335, tracking wheel drive motors 337 and nozzles 341. Tracking wheel drive motors 337 can be driven by water flow to nozzles 341, as is common with irrigation systems, or by electric drive from power control and inverter 317. If desired, a single tracking wheel drive motor 337 can be used to drive wheels for each guide rail 111, 112 or 211, 212. This requires a connection across sprinkler head module 311, but allows the drive along each guide rail 113, 112 or 211, 212 to be synchronized. Nozzles 341 are operated according to water coverage need, so if the entire width of sprinkler head carrier 332 corresponds to land to be irrigated, nozzles 341 across the width of movement are active. As is common in irrigation systems, end nozzles can be activated to extend the width of irrigation coverage, and individual nozzles can be turned off if desired.

Water pump 321 may be any suitable irrigation pump, such as, by way of non-limiting examples, a surface centrifugal pump or a centrifugal jet pump. Alternatively, water storage tank 313 may be positioned on the terrain at a level sufficiently above sprinkler head carrier 332 to supply adequate water pressure to nozzles 341.

Referring to FIGS. 1-3, when the sprinkler system is to be used, rack 101 or 201 is positioned over an area fir which irrigation is desired. It is not necessary that guide rails 111, 112 or 211, 212 be horizontal, so long as sprinkler head module is able to easily move along guide rails 111, 112 or 211, 212. It is desirable that guide rails 111, 112 or 211, 212 be substantially parallel so as to avoid the need for sprinkler head carrier 332 to accommodate changed distances between guide rails 111, 112 or 211, 212.

Legs 121-124 are designed to be positioned substantially in a vertical alignment. In order to accommodate the alignment of guide rails 111, 112 or 211, 212 and accommodate unevenness of the ground, legs 121-124 are adjustable in length or allow the height of guide rails 111, 112 or 211, 212, cross supports 115 and supplemental guide rails 127 to be substantially in a plane. If practical, given the power needed to move sprinkler head module 311 and clearance concerns, guide rails 111, 112 or 211, 212 and cross supports 115 are aligned so that the plane of guide rails 111, 112 or 211, 212 and cross supports 115 is substantially parallel to the ground, with consideration given to required clearance of the component parts from the terrain, crops and other equipment.

The adjustment afforded by legs 121-124 may be achieved by telescoping legs 121-124, as shown in FIG. 1, or by other height adjustment capability, such as positional adjustments as shown in FIG. 2, by adjustment of positioning of guide rails 111, 112 or 211, 212 and cross supports 115 or 215 on legs 221-224, or by any other convenient height adjustment means.

To the extent that a tilt or angular alignment of a plane defined by guide rails 111, 112 or 211, 212 (and consequentially of the cross supports and supplemental guide rails) does not interfere with movement of sprinkler head carrier 332, the plane defined by guide rails 111, 112 or 211, 212 is set to be a desired height above the terrain. The desired height may be such as to provide clearance from the terrain and most of the crops, or may be sufficient for operation of unrelated machinery beneath rack 101 or 201 and sprinkler head module 311.

While solar array 315, power control and inverter 317 are described as powering the irrigation system, it is also contemplated that other sources of power may be used. Similarly, while water tank 313 and water pump 321 are shown, it is also contemplated that water may be piped in directly from a water source such as an irrigation supply or a well. Similarly, instead of water pump 321, the system can be configured so that the water supply, e.g, water tank 313, may be placed at a location elevated from sprinkler head module 311 to provide gravity feed, such as a hilltop or other elevated location afforded by the terrain.

The present disclosure is also directed to a method for providing irrigation. The disclosed method includes the steps of: providing a sprinkler module having a support unit with at least two rails in a parallel arrangement, and having a height adjustment; providing a sprinkler module capable of movement along the rails, with the rails providing a guideway function, and the sprinkler module carrying a plurality of sprinkler nozzles; positioning the rails to form a plane at a desired level above a terrain area for irrigation; and guiding the sprinkler module along the rails in the plane. Also included in the disclosed method are additional steps of providing water in a water storage tank, and pumping water from the water storage tank to the sprinkler module.

In an alternative embodiment of the disclosed method, further steps include: providing water in a water storage tank; providing a solar array; and using power from the solar array for pumping water from the water storage tank to the sprinkler module. In a still further embodiment of the disclosed method, further steps include: providing water in a water storage tank; and placing the water storage tank at a relatively elevated location with respect to the sprinkler module using water line connections between the water storage tank and the sprinkler noddle.

Along with the disclosed method and embodiments thereof, the present disclosure further includes an irrigation system having a sprinkler module including a support unit with sprinkler module guide means, and having a height adjustment; a sprinkler module capable of movement along the sprinkler module guide means, and the sprinkler module carrying a plurality of sprinkler nozzles; and means, comprising the height adjustment, for positioning the sprinkler module guide means to guide the sprinkler module in a plane at a desired level above a terrain area for irrigation. The various modules and means can be as described previously herein, and included: means for providing water in a water storage tank; means for pumping or supplying water from the water storage tank to the sprinkler module; a solar array;

and power conversion means for providing power from the solar array for pumping water from the water storage tank to the sprinkler module.

Closing Statement

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. An irrigation system comprising:
    a plurality of legs positionable in a substantially vertical alignment;
    a sprinkler module comprising a support and a plurality of sprinkler nozzles;
    at least two guide rails, maintained at a substantial parallel separation by at least two cross supports and forming a rack used to provide a guideway for the sprinkler module along the guide rails, with the guide rails and cross supports arranged to form a plane;
    an adjustment for positioning the plane of the guide rails and cross supports at tilt or angular adjustment of the plane to provide a selected alignment of the plane with a terrain location of the irrigation system;
    a water source connection for connection of the sprinkler module to a water source capable of providing a water supply for discharge through the sprinkler modules;
    at least one tracking wheel drive motor for driving the sprinkler module along the guide rails;
    a water storage tank;
    a water pump;
    water line connections between the water storage tank and the water pump and between the water pump and the sprinkler module;
    a solar array; and
    a power control and inverter capable of driving the water pump.

2. The irrigation system of claim 1, wherein the water line connections between the water storage tank and the sprinkler module allow placement of the water storage tank at a relatively elevated location with respect to the sprinkler module.

3. The irrigation system of claim 1, wherein the adjustment for positioning the plane of the guide rails comprises a telescoping or height adjustment capability for adjusting heights of the plurality of legs.

4. The irrigation system of claim 1, wherein the adjustment for positioning the plane of the guide rails comprises an adjustment for positioning of the guide rails on the plurality of legs.

\* \* \* \* \*